United States Patent
Pi et al.

(10) Patent No.: US 11,929,100 B2
(45) Date of Patent: Mar. 12, 2024

(54) VIDEO GENERATION METHOD, APPARATUS, ELECTRONIC DEVICE, STORAGE MEDIUM AND PROGRAM PRODUCT

(71) Applicant: Beijing Baidu Netcom Science Technology Co., Ltd., Beijing (CN)

(72) Inventors: Jimin Pi, Beijing (CN); Xin Wang, Beijing (CN); Guodong Guo, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 0 days.

(21) Appl. No.: 17/887,179

(22) Filed: Aug. 12, 2022

(65) Prior Publication Data

US 2022/0392493 A1 Dec. 8, 2022

(30) Foreign Application Priority Data

Dec. 17, 2021 (CN) .......................... 202111549548.8

(51) Int. Cl.
*G11B 27/036* (2006.01)
*G06F 16/735* (2019.01)
(Continued)

(52) U.S. Cl.
CPC .......... *G11B 27/036* (2013.01); *G06F 16/735* (2019.01); *G06V 30/416* (2022.01); *G10L 13/08* (2013.01)

(58) Field of Classification Search
CPC ... G11B 27/036; G06F 16/735; G06V 30/416; G10L 13/08
See application file for complete search history.

(56) References Cited

U.S. PATENT DOCUMENTS

2017/0228599 A1* 8/2017 De Juan ................. G06V 20/70
2018/0285067 A1* 10/2018 Kawakita ................ G10L 15/30

FOREIGN PATENT DOCUMENTS

CN 103559214 A 2/2014
CN 104731959 A 6/2015
(Continued)

OTHER PUBLICATIONS

Chinese Office Action for Chinese application No. CN202111549548.8, dated May 23, 2023.
(Continued)

*Primary Examiner* — Daniel T Tekle (57) ABSTRACT

This disclosure provides a video generation method, a video generation apparatus, an electronic device, a storage medium and a program product, and relates to the field of artificial intelligence technology, and in particular to the field of computer vision technology and deep learning technology. A specific implementation includes: obtaining document content information of a document; extracting, from the document content information, populating information for multiple scenes in a preset video template; populating the populating information for the multiple scenes into corresponding scenes in the preset video template, respectively, to obtain image information of the multiple scenes; generating audio information of the multiple scenes according to the populating information for the multiple scenes; generating a video of the document based on the image information and audio information of the multiple scenes.

17 Claims, 3 Drawing Sheets

(51) Int. Cl.
*G06V 30/416* (2022.01)
*G10L 13/08* (2013.01)

(56) References Cited

FOREIGN PATENT DOCUMENTS

| | | |
|---|---|---|
| CN | 110781346 A | 6/2015 |
| CN | 109992754 A | 7/2019 |
| CN | 110807126 A | 2/2020 |
| CN | 111460183 A | 7/2020 |
| CN | 113111222 A | 7/2021 |
| CN | 113438543 A | 9/2021 |

OTHER PUBLICATIONS

Chinese Office Action for Chinese application No. CN202111549548. 8, dated Sep. 11, 2023.

* cited by examiner

VIDEO GENERATION METHOD, APPARATUS, ELECTRONIC DEVICE, STORAGE MEDIUM AND PROGRAM PRODUCT

CROSS-REFERENCE TO RELATED APPLICATION

The present application claims a priority to the Chinese patent application No. 202111549548.8 filed in China on Dec. 17, 2021, a disclosure of which is incorporated herein by reference in its entirety.

TECHNICAL FIELD

The present disclosure relates to the field of artificial intelligence technology, and specifically to the field of computer vision technology and deep learning technology, and in particular to a video generation method, a video generation apparatus, an electronic device, a storage medium and a program product.

BACKGROUND

Documents are the main way for people to learn about the content of information and technology, etc. Conventionally, the content of a document is mainly displayed in the form of electronic document, or the content of a document is extracted to obtain a plurality of summary words of the document and the document is displayed by using the plurality of summary words.

SUMMARY

The present disclosure provides a video generation method, a video generation apparatus, an electronic device, a storage medium and a program product.

According to an aspect of the present disclosure, a video generation method is provided, including:
  obtaining document content information of a document;
  extracting, from the document content information, populating information for a plurality of scenes in a preset video template;
  populating the populating information for the plurality of scenes into corresponding scenes in the preset video template, respectively, to obtain image information of the plurality of scenes;
  generating audio information of the plurality of scenes according to the populating information for the plurality of scenes;
  generating a video of the document based on the image information and audio information of the plurality of scenes.

According to another aspect of the present disclosure, a video generation apparatus is provided, including:
  an obtaining module, configured to obtain document content information of a document;
  an extraction module, configured to extract populating information for a plurality of scenes in a preset video template from the document content information;
  a populating module, configured to populate the populating information for the plurality of scenes into corresponding scenes in the preset video template, respectively, to obtain image information of the plurality of scenes;
  a first generating module, configured to generate audio information of the plurality of scenes according to the populating information for the plurality of scenes;
  a second generating module, configured to generate a video of the document based on the image information and audio information of the plurality of scenes.

According to another aspect of the present disclosure, an electronic device is provided, including:
  at least one processor; and
  a memory communicatively connected to the at least one processor; wherein,
  the memory stores therein an instruction configured to be executed by the at least one processor, and the at least one processor is configured to execute the instruction, to implement the video generation method according to the present disclosure.

According to another aspect of the present disclosure, a non-transitory computer readable storage medium storing therein a computer instruction is provided, wherein the computer instruction is configured to be executed by a computer, to implement the video generation method according to the present disclosure.

According to another aspect of the present disclosure, a computer program product including a computer program is provided, wherein the computer program is configured to be executed by a processor, to implement the video generation method according to the present disclosure.

It is understood, this summary is not intended to identify key features or essential features of the embodiments of the present disclosure, nor is it intended to be used to limit the scope of the present disclosure. Other features of the present disclosure will become more comprehensible with reference to the following description.

BRIEF DESCRIPTION OF THE DRAWINGS

The drawings are intended to facilitate a better understanding of solutions of the present disclosure, and do not constitute a limitation on the present disclosure.

DETAILED DESCRIPTION

In the following description, numerous details of the embodiments of the present disclosure, which should be deemed merely as exemplary, are set forth with reference to accompanying drawings, to provide a thorough understanding of the embodiments of the present disclosure. Therefore, those skilled in the art will appreciate that modifications or replacements may be made in the described embodiments without departing from the scope and spirit of the present disclosure. Further, for clarity and conciseness, descriptions of known functions and structures are omitted.

Figure 1:
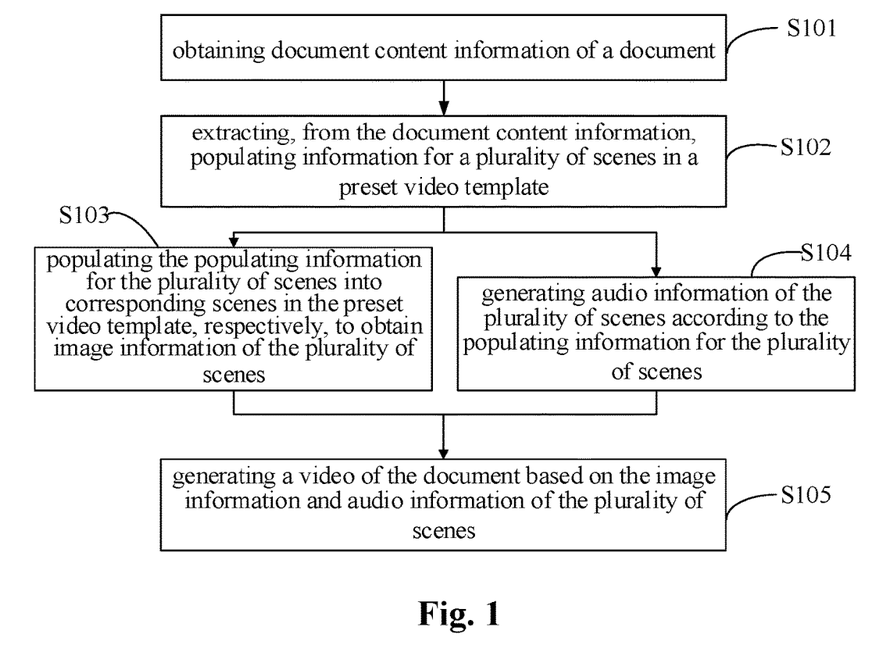
FIG. 1 is a flowchart of a video generation method according to the present disclosure.

FIG. 1 is a flowchart of a video generation method according to the present disclosure. As shown in FIG. 1, the method includes following steps S101 to S105.

Step S101, obtaining document content information of a document.

The document may be an electronic document, for example, a PDF document, or a document in the form of a web page. Additionally, documents in this disclosure may also be referred to as articles.

The obtaining document content information of a document may refer to extracting content such as text, pictures and tables from the document. The extracted document content information may be all or a part of content information of the document. For example, the document can be parsed and reorganized to obtain structured coded documents, thereby the content information of the document can be extracted. For example, various information may be identified with reference to various common templates of big data academic papers, to obtain structured coded documents. In addition, in obtaining document content information, image processing may also be performed on each page of the document, to extract corresponding document content information.

Step S102, extracting, from the document content information, populating information for a plurality of scenes in a preset video template.

The preset video template may be a video template (also referred to as a video storyboard) which is preset according to requirements or document classification. The video template includes a plurality of scenes, wherein each scene may correspond to one subject content. For example, one scene is used to display the basic information such as the title, author and author's affiliation of the document, another scene is used to display the main problems to be addressed and main innovations disclosed in the document, yet another scene is used to display the main methods disclosed in the document, and still another scene is used to display information such as experiments and results in the article.

The populating information for the plurality of scenes may be that each scene corresponds to different populating information, and the populating information may include information such as text information, pictures, and tables. The populating information for each scene is used to indicate the document's specific content in the scene. In this way, the video generated from a plurality of scenes can contain enough core content of the document, to improve the display effect of the document content.

Step S103, populating the populating information for the plurality of scenes into corresponding scenes in the preset video template, respectively, to obtain image information of the plurality of scenes.

This step may refer to populating the populating information for each scene into the corresponding scene in the video template, and each scene includes a plurality of video frames.

Step S104, generating audio information of the plurality of scenes according to the populating information for the plurality of scenes.

This step may refer to converting a part or all of the text in the populating information for each scene into audio information, so as to obtain the audio information of each scene.

It should be noted that, the execution order of step S103 and step S104 is not limited in the present disclosure. These two steps may be executed simultaneously or sequentially, for example, step S103 is executed first and then step S104 is executed, or step S104 is executed first and then step S103 is executed.

Step S105, generating a video of the document based on the image information and audio information of the plurality of scenes.

The generating the video of the document based on the image information and audio information of the plurality of scenes may refer to: performing video composition and layout of the image information of all scenes, selecting the corresponding audio information, and adjusting the duration of each scene, aligning various contents, and outputting the video of the document.

In the present disclosure, the video may be referred to as a short video, for example, a video with a duration shorter than or equal to a preset duration, such as a short video with a duration shorter than or equal to 5 or 6 minutes. Optionally, in some scenarios or implementations, the duration of the video is not limited, and may be specifically determined based on the content of the document.

In the present disclosure, through the foregoing steps, the populating information for the plurality of scenes in the preset video template can be extracted, the image information and audio information of each scene can be obtained, and the video of the document can be generated, so that the content of the document can be displayed through the video, which can improve the display effect of the document content. For example, the video generated according to the present disclosure can help a viewer to quickly browse the content of the document, quickly grasp the core content of the document, and perform coarse filtering of a large quantity of documents. Further, if the viewer is interested in the details of the article after watching the video, he/she can read the original document in detail.

It should also be noted that the foregoing method provided in the present disclosure may be implemented by an electronic device, for example, the foregoing method may be implemented by an electronic device such as a server, a computer, or a mobile phone.

As an optional implementation, the document content information includes a plurality of pieces of content information, and the extracting the populating information for the plurality of scenes in the preset video template from the document content information includes:

determining a logical relationship between the plurality of pieces of content information;

extracting target content information for each scene in the preset video template from the plurality of pieces of content information;

extracting logical association information of each target content information from the plurality of pieces of content information according to the logical relationship, wherein the logical association information of the target content information includes information having a preset logical relationship with the target content information;

wherein the populating information for each scene includes: target content information for the scene, and logical association information of the target content information for the scene.

The plurality of pieces of content information may be content information of a plurality of different pages and different chapters. The determining the logical relationship between the plurality of pieces of content information may refer to logically understanding the plurality of pieces of content information to obtain the logical relationship between the plurality of pieces of content information. The logical relationship includes, but is not limited to: a subordinate logical relationship, a parallel logical relationship, and a contextual logical relationship.

The extracting the target content information for each scene in the preset video template from the plurality of pieces of content information may refer to extracting, from the plurality of pieces of content information, key content information matching each scene.

The preset logical relationship may include, but is not limited to: a subordinate logical relationship and a contextual logical relationship, and may be set in advance according to actual requirements.

In this implementation, since the determined populating information for each scene includes the target content information and the logical association information of the target content information for the scene, the video content of each scene can be enriched, so that each scene in the resultant video may display richer content information of the document in the scene, which can further improve the display effect of the document content.

Optionally, the extracting the target content information for each scene in the preset video template from the plurality of pieces of content information includes:

querying, according to preset query information of a target scene, target content information matching the preset query information among the plurality of pieces of content information; or querying, according to preset inquiry information of the target scene, target content information matching the preset inquiry information among the plurality of pieces of content information;

wherein the target scene is any scene in the preset video template.

The querying, according to the preset query information of the target scene, the target content information matching the preset query information among the plurality of pieces of content information may refer to querying, among the plurality of pieces of content information, a target content information which is the closest match to the preset query information. For example, query information is designed for each scene, and the closest related sentence in the document is retrieved as the target content information for the scene.

The querying, according to the preset inquiry information of the target scene, the target content information matching the preset inquiry information among the plurality of pieces of content information may refer to querying, among the plurality of pieces of content information, a target content information which is the closest match to the preset inquiry information. For example, a question is designed for each scene, and the information having an answer closest related to the question is retrieved in the document as the target content information for the scene.

That the target scene is any scene in the preset video template can be understood as: in the implementation, the target content information for each scene can be determined according to the foregoing two manners.

In this implementation, since the target content information for each scene can be retrieved by means of query information or inquiry information, the accuracy of the target content information for each scene can be improved.

Optionally, the querying, according to the preset query information of the target scene, the target content information matching the preset query information among the plurality of pieces of content information includes:

querying, according to the preset query information of the target scene, a plurality of pieces of candidate query information matching the preset query information among the plurality of pieces of content information;

calculating semantic correlation information between each of the plurality of pieces of candidate query information and the preset query information, and calculating contextual correlation information between a title of each of the plurality of pieces of candidate query information and corresponding reference context information, wherein each of the plurality of pieces of candidate query information has the corresponding reference context information in the document;

calculating score information of each of the plurality of pieces of candidate query information based on the semantic correlation information and the contextual correlation information;

determining, according to the score information of each of the plurality of pieces of candidate query information, the target content information matching the preset query information among the plurality of pieces of candidate query information.

The calculating the semantic correlation information between each of the plurality of pieces of candidate query information and the preset query information may refer to calculating semantic correlationship or semantic correlation degree between each of the plurality of pieces of candidate query information and the preset query information.

The calculating the contextual correlation information between the title of each of the plurality of pieces of candidate query information and corresponding reference context information may refer to calculating contextual correlation degree or contextual correlationship between the title of each of the plurality of pieces of candidate query information and corresponding reference context information, and may specifically refer to calculating the relevancy between the title and the reference context information.

The reference context information in the document that corresponds to the candidate query information may refer to a context in which the candidate query information is referred to in the document, or content information that refers to the candidate query information in the document.

The calculating the score information of each of the plurality of pieces of candidate query information based on the semantic correlation information and the contextual correlation information may refer to calculating a score or specific score level of each candidate query information based on the semantic correlation information and the contextual correlation information. For example, the score information can be simply calculated according to a rule that the higher the degree of correlation of the semantic correlation information and the contextual correlation information, the higher the score; or the semantic correlation information and the contextual correlation information may be preconfigured with corresponding weights, and weighted score information can be calculated based on the corresponding weights.

The determining, according to the score information of each of the plurality of pieces of candidate query information, the target content information matching the preset query information among the plurality of pieces of candidate query information may refer to selecting, from the plurality of pieces of candidate query information, content information with the highest score as the target content information.

In this implementation, since the score information of each of the plurality of pieces of candidate query information is calculated, and then the target content information is selected according to the score information, the accuracy of the target content information can be further improved.

It should be noted that, according to the present disclosure, the target content information for some scenes may be determined through this implementation; specifically, the target content information for some scenes may be determined through this implementation, and the target content information of these scenes includes picture/table. For example, the logical relationship between the picture/table and the main body of the document is understood, to identify the relative importance of the picture/table; then various text features of the picture/table are extracted, wherein the text features include, but are not limited to: the title of the picture/table, the title of the chapter/subchapter in the document that refers to the picture/table, the contextual text of the chapter referring to the picture/table, and the like; thereafter, according to the query information designed for each scene of the video, the semantic correlationship between each feature of the picture/table and the query information is determined, and a weighted score is calculated based on the weights of the semantic correlationship and the correlationship between the title and the reference context; finally, the picture/table information corresponding to each scene is selected based on all the scores.

In addition, the present disclosure is not limited to determining the target content information matching the query information through the foregoing manner. For example, for a scene whose populating information is text content information, the closest related text information can be directly determined according to the query information as the target content information.

Optionally, the querying, according to the preset inquiry information of the target scene, the target content information matching the preset inquiry information among the plurality of pieces of content information includes:
    querying, according to the preset inquiry information of the target scene, the plurality of pieces of candidate inquiry information matching the preset inquiry information in semantics among the plurality of pieces of content information;
    inputting separately the plurality of pieces of candidate inquiry information and the preset inquiry information into a preset question-and-answer (QA) algorithm for question-and-answer processing, to obtain answer information to each of the plurality of pieces of candidate inquiry information;
    determining, according to the answer information to each of the plurality of pieces of candidate inquiry information, the target content information matching the preset inquiry information among the plurality of pieces of candidate inquiry information.

The querying the plurality of pieces of candidate inquiry information matching the preset inquiry information in semantics among the plurality of pieces of content information may refer to querying a plurality of pieces of candidate inquiry information whose semantics are similar to the semantics of the preset inquiry information among the plurality of pieces of content information.

The preset QA algorithm may be a QA algorithm set in advance according to actual requirements. In addition, the QA algorithm is not limited in the present disclosure, for example, it may be a transformer-based QA algorithm, or a commonly used QA algorithm.

The determining, according to the answer information to each of the plurality of pieces of candidate inquiry information, the target content information matching the preset inquiry information among the plurality of pieces of candidate inquiry information may refer to selecting, among the plurality of pieces of content information, content information whose answer is the closest match to the preset inquiry information as the target content information, or may refer to selecting the target content information in accordance with whether the answer information is accurate, e.g., selecting, among the plurality of pieces of candidate query information, content information whose answer information is accurate as the target content information.

In this implementation, since the target content information matching the preset inquiry information is determined among the plurality of pieces of candidate inquiry information according to the answer information to each of the plurality of pieces of candidate inquiry information, the accuracy of the target content information can be improved, thereby further improving display effect of the document content.

In addition, the present disclosure is not limited to determining the target content information matching the inquiry information through the foregoing manner. For example, it is possible to directly determine, among a plurality of pieces of content information, one piece of content information matching the preset inquiry information as the target content information.

As an optional implementation, the extracting, from the document content information, the populating information for a plurality of scenes in a preset video template includes:
    querying, according to a preset keyword of each scene, the populating information for each scene in the document content information.

In this implementation, the populating information for each scene can be quickly and simply determined through using the preset keyword.

As an optional implementation, the document content information includes at least one of the following:
    structured text information; or,
    media information and description information of the media information, the media information including at least one of picture or table.

The structured text information may be obtained by extracting, according to a preset structure, specific text information from the text information of the foregoing document content information. For example, the article title, author, author's affiliation, abstract, title and subtitle of each chapter, and the structure of corresponding text are extracted to obtain the text information of the corresponding structure.

The description information of the media information may be text information for describing the media information, which includes, but is not limited to: attributes, context information, and reference information, wherein the attributes include attribute information such as title, size, and position in the document.

In this implementation, the media information may be regarded as image, and the media information and description information of the media information can be extracted in form of image.

In this implementation, the textual populating information corresponding to each scene can be quickly obtained through the structured text information, so as to improve the efficiency of video generating; and with the aid of the media information and the description information of the media information, the populating information for some scenes may include at least one of picture or table, which can improve the display effect of the video.

As an optional implementation, the generating the audio information of the plurality of scenes according to the populating information for the plurality of scenes includes:
    extracting key text information from the populating information for the plurality of scenes, respectively, and converting the key text information into audio information to obtain the audio information of the plurality of scenes.

The extracting key text information from the populating information for the scenes may refer to performing semantic analysis on the populating information for each scene to obtain the key text information of each piece of populating information. The key text information of the picture/table may be key text information converted from the key image/table content of the picture/table.

The converting the key text information into audio information may refer to converting the key text information into voiceover.

In this implementation, since the key text information is converted into audio information to obtain the audio information for a plurality of scenes, only the audio of the key text information needs to be played in the video, which can improve the audio presentation effect of the video.

It should be noted that the present disclosure is not limited to generating audio information by extracting key text information. For example, in some implementations or scenarios, all populating information may be directly converted into audio information.

Further, in some implementations, corresponding background music can be preconfigured for each scene to further improve the audio presentation effect of the video.

In the technical solution of the present disclosure, the populating information for the plurality of scenes in the preset video template is extracted, and the image information and audio information of each scene are obtained, and the video of the document is generated, so that the content of the document can be displayed through the video, which can improve the display effect of the document content.

Figure 2:
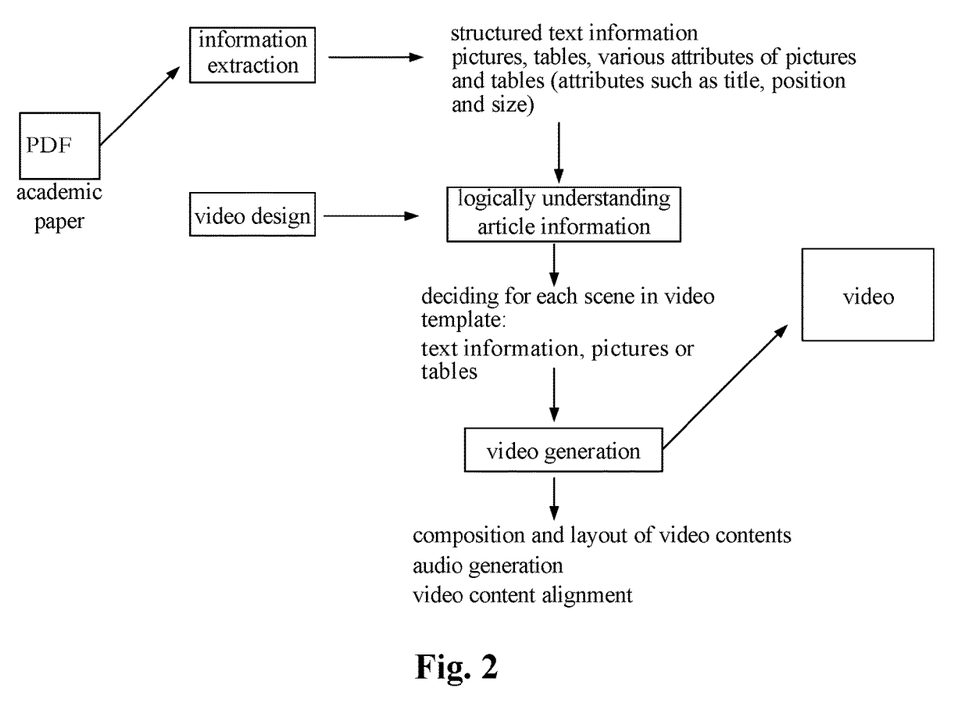
FIG. 2 is a schematic diagram of a video generation method according to the present disclosure.

FIG. 2 is a schematic diagram of a video generation method according to the present disclosure. As shown in FIG. 2, an academic paper is used as an example of the document. The method includes following parts: 1. information extraction, 2. video design, and 3. video generation.

1. Information Extraction

This part includes extracting structured text information, pictures, tables, and various attributes of pictures and tables, such as title, position, and size, from the academic paper.

2. Video Design

This part includes logically understanding the article information, that is, determining the logical relationship between various pieces of content information in the article; and deciding at least one of text information, picture or table for each scene in the video template.

3. Video Generation

This part includes composition and layout of video contents, audio generation, and video content alignment.

The video of the academic paper is generated through the foregoing three parts. Displaying the document by means of the video can improve the display effect of contents of the document.

Figure 3:
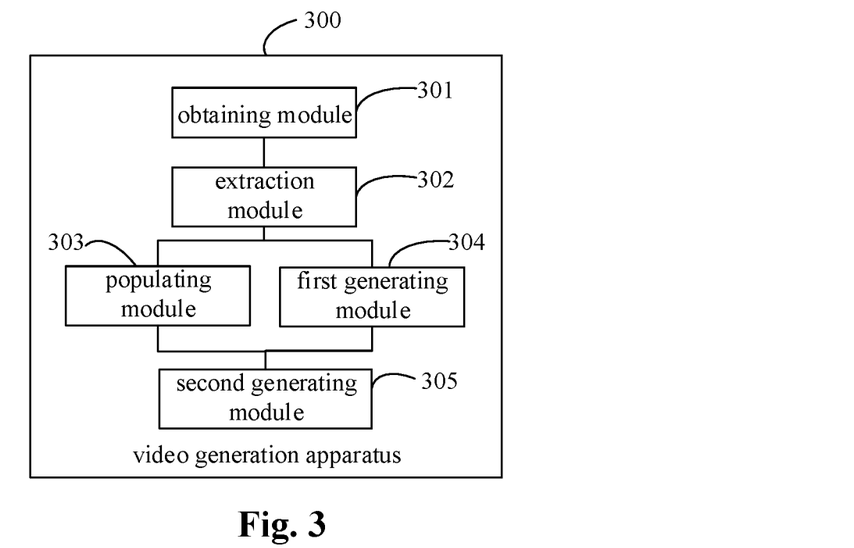
FIG. 3 is a structural diagram of a video generation apparatus according to the present disclosure.

FIG. 3 illustrates a video generation apparatus according to the present disclosure. As shown in FIG. 3, the video generation apparatus 300 includes:
- an obtaining module 301, configured to obtain document content information of a document;
- an extraction module 302, configured to extract populating information for a plurality of scenes in a preset video template from the document content information;
- a populating module 303, configured to populate the populating information for the plurality of scenes into corresponding scenes in the preset video template, respectively, to obtain the image information of the plurality of scenes;
- a first generating module 304, configured to generate audio information of the plurality of scenes according to the populating information for the plurality of scenes;
- a second generating module 305, configured to generate a video of the document based on the image information and audio information of the plurality of scenes.

Figure 4:
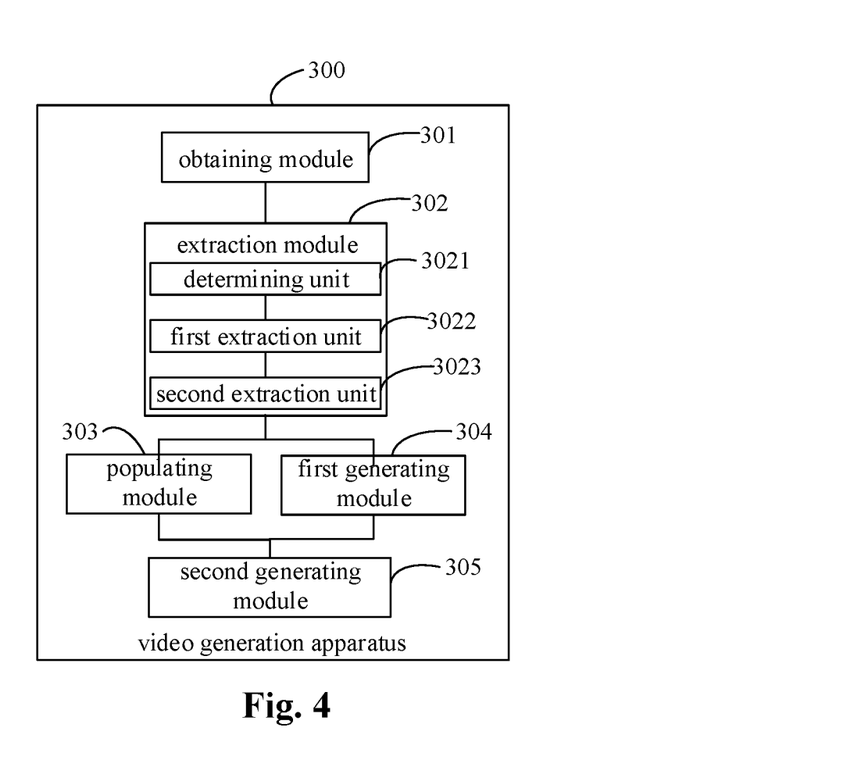
FIG. 4 is another structural diagram of a video generation apparatus according to the present disclosure.

Optionally, the document content information includes a plurality of pieces of content information. As shown in FIG. 4, the extraction module 302 includes:
- a determining unit 3021, configured to determine a logical relationship between the plurality of pieces of content information;
- a first extraction unit 3022, configured to extract target content information for each scene in the preset video template from the plurality of pieces of content information;
- a second extracting unit 3023, configured to extract logical association information of each target content information from the plurality of pieces of content information according to the logical relationship, wherein the logical association information of the target content information includes information having a preset logical relationship with the target content information;
- wherein the populating information for each scene includes: target content information for the scene, and logical association information of the target content information for the scene.

Optionally, the first extraction unit 3022 is configured to:
query, according to preset query information of the target scene, target content information matching the preset query information among the plurality of pieces of content information; or
query, according to preset inquiry information of the target scene, target content information matching the preset inquiry information among the plurality of pieces of content information;
wherein the target scene is any scene in the preset video template.

Optionally, the first extraction unit 3022 is configured to:
query, according to the preset query information of the target scene, a plurality of pieces of candidate query information matching the preset query information among the plurality of pieces of content information;
calculate semantic correlation information between each of the plurality of pieces of candidate query information and the preset query information, and calculate contextual correlation information between a title of each of the plurality of pieces of candidate query information and corresponding reference context information, wherein each of the plurality of pieces of candidate query information has the corresponding reference context information in the document;
calculate score information of each of the plurality of pieces of candidate query information based on the semantic correlation information and the contextual correlation information;
determine, according to the score information of each of the plurality of pieces of candidate query information, the target content information matching the preset query information among the plurality of pieces of candidate query information.

Optionally, the first extraction unit 3022 is configured to:
query, according to the preset inquiry information of the target scene, a plurality of pieces of candidate inquiry information matching the preset inquiry information in semantics among the plurality of pieces of content information;

input separately the plurality of pieces of candidate inquiry information and the preset inquiry information into a preset question-and-answer (QA) algorithm for question-and-answer processing to obtain answer information to each of the plurality of pieces of candidate inquiry information;

determine, according to the answer information to each of the plurality of pieces of candidate inquiry information, the target content information matching the preset inquiry information among the plurality of pieces of candidate inquiry information.

Optionally, the document content information includes at least one of the following:

structured text information; or media information and description information of the media information, the media information including at least one of picture or table.

Optionally, the first generating module 304 is configured to extract key text information from the populating information for the plurality of scenes, respectively, and convert the key text information into audio information to obtain the audio information of the plurality of scenes.

It should be noted here that the apparatus provided in the embodiment of the present disclosure can realize all the method steps implemented by the foregoing method embodiment and can achieve the same technical effect. The parts that are the same as those in the method embodiment and their beneficial effects will not be repeated here.

According to embodiments of the present disclosure, an electronic device, a readable storage medium and a computer program product are further provided.

Figure 5:
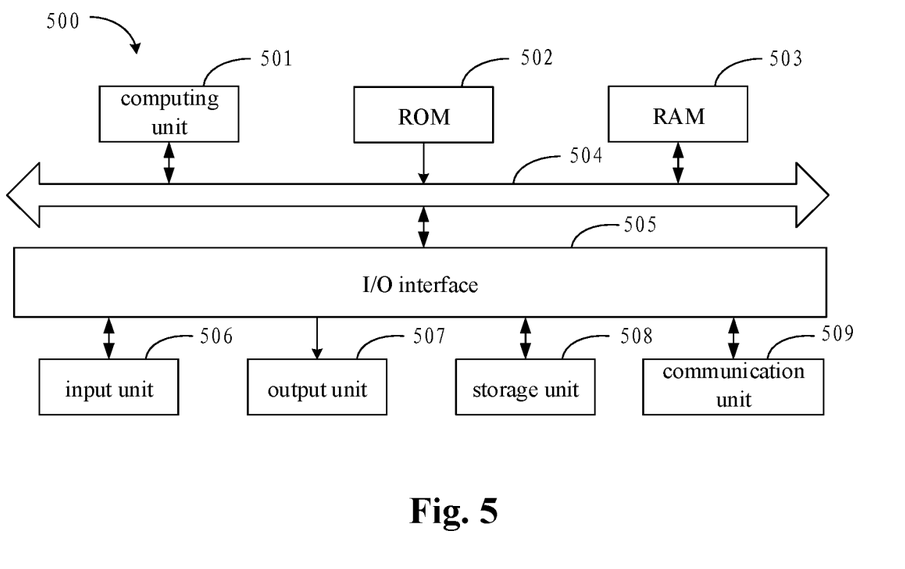
FIG. 5 is a block diagram of an electronic device configured to implement a video generation method according to an embodiment of the present disclosure.

FIG. 5 is a schematic block diagram of an exemplary electronic device 500 in which embodiments of the present disclosure may be implemented. The electronic device is intended to represent all kinds of digital computers, such as a laptop computer, a desktop computer, a work station, a personal digital assistant, a server, a blade server, a main frame or other suitable computers. The electronic device may also represent all kinds of mobile devices, such as a personal digital assistant, a cell phone, a smart phone, a wearable device and other similar computing devices. The components shown here, their connections and relationships, and their functions, are meant to be exemplary only, and are not meant to limit implementations of the present disclosure described and/or claimed herein.

As shown in FIG. 5, the device 500 includes a computing unit 501, which may carry out various suitable actions and processes according to a computer program stored in a read-only memory (ROM) 502 or a computer program loaded from a storage unit 508 into a random access memory (RAM) 503. The RAM 503 may as well store therein all kinds of programs and data required for the operation of the device 500. The computing unit 501, the ROM 502 and the RAM 503 are connected to each other through a bus 504. An input/output (I/O) interface 505 is also connected to the bus 504.

Multiple components in the device 500 are connected to the I/O interface 505. The multiple components include: an input unit 506, e.g., a keyboard, a mouse and the like; an output unit 507, e.g., a variety of displays, loudspeakers, and the like; a storage unit 508, e.g., a magnetic disk, an optic disc and the like; and a communication unit 509, e.g., a network card, a modem, a wireless transceiver, and the like. The communication unit 509 allows the device 500 to exchange information/data with other devices through a computer network, such as the Internet, and/or other telecommunication networks.

The computing unit 501 may be any general purpose and/or special purpose processing components having a processing and computing capability. Some examples of the computing unit 501 include, but are not limited to: a central processing unit (CPU), a graphic processing unit (GPU), various special purpose artificial intelligence (AI) computing chips, various computing units running a machine learning model algorithm, a digital signal processor (DSP), and any suitable processor, controller, microcontroller, etc. The computing unit 501 carries out the aforementioned methods and processes, e.g., the video generation method. For example, in some embodiments, the video generation method may be implemented as a computer software program tangibly embodied in a machine readable medium such as the storage unit 508. In some embodiments, all or a part of the computer program may be loaded and/or installed on the device 500 through the ROM 502 and/or the communication unit 509. When the computer program is loaded into the RAM 503 and executed by the computing unit 501, one or more steps of the foregoing video generation method may be implemented. Optionally, in other embodiments, the computing unit 501 may be configured in any other suitable manner (e.g., by means of a firmware) to implement the video generation method.

Various implementations of the aforementioned systems and techniques may be implemented in a digital electronic circuit system, an integrated circuit system, a field-programmable gate array (FPGA), an application specific integrated circuit (ASIC), an application specific standard product (ASSP), a system on a chip (SOC), a complex programmable logic device (CPLD), a computer hardware, a firmware, a software, and/or a combination thereof. The various implementations may include an implementation in form of one or more computer programs. The one or more computer programs may be executed and/or interpreted on a programmable system including at least one programmable processor. The programmable processor may be a special purpose or general purpose programmable processor, may receive data and instructions from a storage system, at least one input device and at least one output device, and may transmit data and instructions to the storage system, the at least one input device and the at least one output device.

Program codes for implementing the methods of the present disclosure may be written in one programming language or any combination of multiple programming languages. These program codes may be provided to a processor or controller of a general purpose computer, a special purpose computer, or other programmable data processing device, such that the functions/operations specified in the flow diagram and/or block diagram are implemented when the program codes are executed by the processor or controller. The program codes may be run entirely on a machine, run partially on the machine, run partially on the machine and partially on a remote machine as a standalone software package, or run entirely on the remote machine or server.

In the context of the present disclosure, the machine readable medium may be a tangible medium, and may include or store a program used by an instruction execution system, device or apparatus, or a program used in conjunction with the instruction execution system, device or apparatus. The machine readable medium may be a machine readable signal medium or a machine readable storage medium. The machine readable medium includes, but is not limited to: an electronic, magnetic, optical, electromagnetic, infrared, or semiconductor system, device or apparatus, or any suitable combination thereof. A more specific example of the machine readable storage medium includes: an electrical connection based on one or more wires, a portable computer disk, a hard disk, a random access memory (RAM), a read only memory (ROM), an erasable programmable read only memory (EPROM or flash memory), an optic fiber, a portable compact disc read only memory (CD-ROM), an optical storage device, a magnetic storage device, or any suitable combination thereof.

To facilitate user interaction, the system and technique described herein may be implemented on a computer. The computer is provided with a display device (for example, a cathode ray tube (CRT) or liquid crystal display (LCD) monitor) for displaying information to a user, a keyboard and a pointing device (for example, a mouse or a track ball). The user may provide an input to the computer through the keyboard and the pointing device. Other kinds of devices may be provided for user interaction, for example, a feedback provided to the user may be any manner of sensory feedback (e.g., visual feedback, auditory feedback, or tactile feedback); and input from the user may be received by any means (including sound input, voice input, or tactile input).

The system and technique described herein may be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the system and technique), or any combination of such back-end, middleware, or front-end components. The components of the system can be interconnected by any form or medium of digital data communication (e.g., a communication network). Examples of communication networks include a local area network (LAN), a wide area network (WAN) and the Internet.

The computer system can include a client and a server. The client and server are generally remote from each other and typically interact through a communication network. The relationship of client and server arises by virtue of computer programs running on respective computers and having a client-server relationship to each other. The server can be a cloud server, a server of a distributed system, or a server combined with a blockchain.

It is appreciated, all forms of processes shown above may be used, and steps thereof may be reordered, added or deleted. For example, as long as expected results of the technical solutions of the present disclosure can be achieved, steps set forth in the present disclosure may be performed in parallel, performed sequentially, or performed in a different order, and there is no limitation in this regard.

The foregoing specific implementations constitute no limitation on the scope of the present disclosure. It is appreciated by those skilled in the art, various modifications, combinations, sub-combinations and replacements may be made according to design requirements and other factors. Any modifications, equivalent replacements and improvements made without deviating from the spirit and principle of the present disclosure shall be deemed as falling within the scope of the present disclosure.

What is claimed is:

1. A video generation method, comprising:
obtaining document content information of a document;
extracting, from the document content information, populating information for a plurality of scenes in a preset video template;
populating the populating information for the plurality of scenes into corresponding scenes in the preset video template, respectively, to obtain image information of the plurality of scenes;
generating audio information of the plurality of scenes according to the populating information for the plurality of scenes;
generating a video of the document based on the image information and audio information of the plurality of scenes;
wherein the document content information comprises a plurality of pieces of content information, and the extracting, from the document content information, the populating information for the plurality of scenes comprises:
determining a logical relationship between the plurality of pieces of content information;
extracting target content information for each scene in the preset video template from the plurality of pieces of content information;
extracting logical association information of each target content information from the plurality of pieces of content information according to the logical relationship, wherein the logical association information of the target content information comprises information having a preset logical relationship with the target content information;
wherein the populating information for each scene comprises: the target content information for the scene, and the logical association information of the target content information for the scene.

2. The video generation method according to claim 1, wherein the extracting the target content information for each scene in the preset video template from the plurality of pieces of content information comprises:
querying, according to preset query information of a target scene, target content information matching the preset query information among the plurality of pieces of content information; or
querying, according to preset inquiry information of the target scene, target content information matching the preset inquiry information among the plurality of pieces of content information;
wherein the target scene is any scene in the preset video template.

3. The video generation method according to claim 2, wherein the querying, according to the preset query information of the target scene, the target content information matching the preset query information among the plurality of pieces of content information comprises:
querying, according to the preset query information of the target scene, a plurality of pieces of candidate query information matching the preset query information among the plurality of pieces of content information;
calculating semantic correlation information between each of the plurality of pieces of candidate query information and the preset query information, and calculating contextual correlation information between a title of each of the plurality of pieces of candidate query information and corresponding reference context information, wherein each of the plurality of pieces of candidate query information has the corresponding reference context information in the document;

calculating score information of each of the plurality of pieces of candidate query information based on the semantic correlation information and the contextual correlation information;

determining, according to the score information of each of the plurality of pieces of candidate query information, the target content information matching the preset query information among the plurality of pieces of candidate query information.

4. The video generation method according to claim 2, wherein the querying, according to the preset inquiry information of the target scene, the target content information matching the preset inquiry information among the plurality of pieces of content information comprises:

querying, according to the preset inquiry information of the target scene, a plurality of pieces of candidate inquiry information matching the preset inquiry information in semantics among the plurality of pieces of content information;

inputting separately the plurality of pieces of candidate inquiry information and the preset inquiry information into a preset question-and-answer (QA) algorithm for question-and-answer processing, to obtain answer information to each of the plurality of pieces of candidate inquiry information;

determining, according to the answer information to each of the plurality of pieces of candidate inquiry information, the target content information matching the preset inquiry information among the plurality of pieces of candidate inquiry information.

5. The video generation method according to claim 1, wherein the document content information comprises at least one of the following:

structured text information; or media information and description information of the media information, the media information comprising at least one of picture or table.

6. The video generation method according to claim 1, wherein the generating the audio information of the plurality of scenes according to the populating information for the plurality of scenes comprises:

extracting key text information from the populating information for the plurality of scenes, respectively, and converting the key text information into audio information to obtain the audio information of the plurality of scenes.

7. An electronic device, comprising:

at least one processor; and a memory communicatively connected to the at least one processor; wherein, the memory stores therein an instruction configured to be executed by the at least one processor, and the at least one processor is configured to execute the instruction, to implement a video generation method comprising:

obtaining document content information of a document;

extracting, from the document content information, populating information for a plurality of scenes in a preset video template;

populating the populating information for the plurality of scenes into corresponding scenes in the preset video template, respectively, to obtain image information of the plurality of scenes;

generating audio information of the plurality of scenes according to the populating information for the plurality of scenes;

generating a video of the document based on the image information and audio information of the plurality of scenes;

wherein the document content information comprises a plurality of pieces of content information, and the extracting, from the document content information, the populating information for the plurality of scenes comprises:

determining a logical relationship between the plurality of pieces of content information;

extracting target content information for each scene in the preset video template from the plurality of pieces of content information;

extracting logical association information of each target content information from the plurality of pieces of content information according to the logical relationship, wherein the logical association information of the target content information comprises information having a preset logical relationship with the target content information;

wherein the populating information for each scene comprises: the target content information for the scene, and the logical association information of the target content information for the scene.

8. The electronic device according to claim 7, wherein the extracting the target content information for each scene in the preset video template from the plurality of pieces of content information comprises:

querying, according to preset query information of a target scene, target content information matching the preset query information among the plurality of pieces of content information; or querying, according to preset inquiry information of the target scene, target content information matching the preset inquiry information among the plurality of pieces of content information;

wherein the target scene is any scene in the preset video template.

9. The electronic device according to claim 8, wherein the querying, according to the preset query information of the target scene, the target content information matching the preset query information among the plurality of pieces of content information comprises:

querying, according to the preset query information of the target scene, a plurality of pieces of candidate query information matching the preset query information among the plurality of pieces of content information;

calculating semantic correlation information between each of the plurality of pieces of candidate query information and the preset query information, and calculating contextual correlation information between a title of each of the plurality of pieces of candidate query information and corresponding reference context information, wherein each of the plurality of pieces of candidate query information has the corresponding reference context information in the document;

calculating score information of each of the plurality of pieces of candidate query information based on the semantic correlation information and the contextual correlation information;

determining, according to the score information of each of the plurality of pieces of candidate query information, the target content information matching the preset query information among the plurality of pieces of candidate query information.

10. The electronic device according to claim 8, wherein the querying, according to the preset inquiry information of the target scene, the target content information matching the preset inquiry information among the plurality of pieces of content information comprises:

querying, according to the preset inquiry information of the target scene, a plurality of pieces of candidate inquiry information matching the preset inquiry information in semantics among the plurality of pieces of content information;

inputting separately the plurality of pieces of candidate inquiry information and the preset inquiry information into a preset question-and-answer (QA) algorithm for question-and-answer processing, to obtain answer information to each of the plurality of pieces of candidate inquiry information;

determining, according to the answer information to each of the plurality of pieces of candidate inquiry information, the target content information matching the preset inquiry information among the plurality of pieces of candidate inquiry information.

11. The electronic device according to claim 7, wherein the document content information comprises at least one of the following:

structured text information; or media information and description information of the media information, the media information comprising at least one of picture or table.

12. The electronic device according to claim 7, wherein the generating the audio information of the plurality of scenes according to the populating information for the plurality of scenes comprises:

extracting key text information from the populating information for the plurality of scenes, respectively, and converting the key text information into audio information to obtain the audio information of the plurality of scenes.

13. A non-transitory computer readable storage medium storing therein a computer instruction, wherein the computer instruction is configured to be executed by a computer, to implement a video generation method comprising:

obtaining document content information of a document;

extracting, from the document content information, populating information for a plurality of scenes in a preset video template;

populating the populating information for the plurality of scenes into corresponding scenes in the preset video template, respectively, to obtain image information of the plurality of scenes;

generating audio information of the plurality of scenes according to the populating information for the plurality of scenes;

generating a video of the document based on the image information and audio information of the plurality of scenes;

wherein the document content information comprises a plurality of pieces of content information, and the extracting, from the document content information, the populating information for the plurality of scenes comprises:

determining a logical relationship between the plurality of pieces of content information;

extracting target content information for each scene in the preset video template from the plurality of pieces of content information;

extracting logical association information of each target content information from the plurality of pieces of content information according to the logical relationship, wherein the logical association information of the target content information comprises information having a preset logical relationship with the target content information;

wherein the populating information for each scene comprises: the target content information for the scene, and the logical association information of the target content information for the scene.

14. The non-transitory computer readable storage medium according to claim 13, wherein the extracting the target content information for each scene in the preset video template from the plurality of pieces of content information comprises:

querying, according to preset query information of a target scene, target content information matching the preset query information among the plurality of pieces of content information; or     querying, according to preset inquiry information of the target scene, target content information matching the preset inquiry information among the plurality of pieces of content information;

wherein the target scene is any scene in the preset video template.

15. The non-transitory computer readable storage medium according to claim 14, wherein the querying, according to the preset query information of the target scene, the target content information matching the preset query information among the plurality of pieces of content information comprises:

querying, according to the preset query information of the target scene, a plurality of pieces of candidate query information matching the preset query information among the plurality of pieces of content information;

calculating semantic correlation information between each of the plurality of pieces of candidate query information and the preset query information, and calculating contextual correlation information between a title of each of the plurality of pieces of candidate query information and corresponding reference context information, wherein each of the plurality of pieces of candidate query information has the corresponding reference context information in the document;

calculating score information of each of the plurality of pieces of candidate query information based on the semantic correlation information and the contextual correlation information;

determining, according to the score information of each of the plurality of pieces of candidate query information, the target content information matching the preset query information among the plurality of pieces of candidate query information.

16. The non-transitory computer readable storage medium according to claim 14, wherein the querying, according to the preset inquiry information of the target scene, the target content information matching the preset inquiry information among the plurality of pieces of content information comprises:

querying, according to the preset inquiry information of the target scene, a plurality of pieces of candidate inquiry information matching the preset inquiry information in semantics among the plurality of pieces of content information;

inputting separately the plurality of pieces of candidate inquiry information and the preset inquiry information into a preset question-and-answer (QA) algorithm for question-and-answer processing, to obtain answer information to each of the plurality of pieces of candidate inquiry information;

determining, according to the answer information to each of the plurality of pieces of candidate inquiry information, the target content information matching the preset inquiry information among the plurality of pieces of candidate inquiry information.

17. The non-transitory computer readable storage medium according to claim 13, wherein the document content information comprises at least one of the following:

structured text information; or media information and description information of the media information, the media information comprising at least one of picture or table.

* * * * *